United States Patent [19]
Cowdrey

[11] Patent Number: 4,493,647
[45] Date of Patent: Jan. 15, 1985

[54] WEATHER RADAR SIMULATOR

[75] Inventor: Dennis A. Cowdrey, Pulborough, England

[73] Assignee: The Singer Company, Binghamton, N.Y.

[21] Appl. No.: 362,710

[22] Filed: Mar. 29, 1982

[30] Foreign Application Priority Data

Jul. 30, 1981 [GB] United Kingdom ............... 8123416

[51] Int. Cl.³ ............................................. G01S 7/24
[52] U.S. Cl. ................................... 434/2; 343/5 W
[58] Field of Search ................. 343/5 W; 434/2, 3, 4

[56] References Cited

U.S. PATENT DOCUMENTS 3,514,521 5/1970 Burchard et al. ................. 434/2
4,421,484 12/1983 Wakeling et al. ................. 434/3

Primary Examiner—Maynard R. Wilbur
Assistant Examiner—Gilberto Barrón, Jr.
Attorney, Agent, or Firm—Douglas M. Clarkson

[57] ABSTRACT

A beam position processor (15) generates address signals representing the spatial coordinates of points on a simulated radar beam, for a plurality of beam directions. The address signals serve for readout of weather information (e.g. cloud intensity, ceiling and base height data) from a data storage means (16) for further processing to form a video signal for display. The storage means (16) is arranged for economy of memory capacity in that the higher order parts of the address are used to read out code words from a database memory (17). Each code word selects one of a set of predetermined cloud patterns in cloud pattern memories (18, 19) and the lower order parts of the address access data corresponding to individual cells of the selected pattern.

5 Claims, 5 Drawing Figures

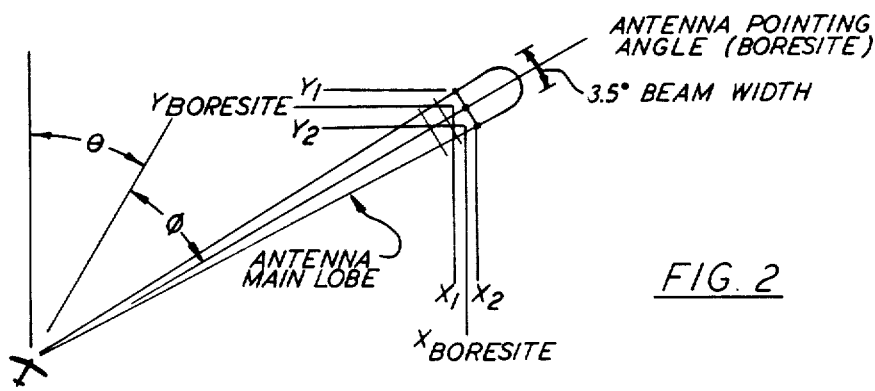
FIG. 2
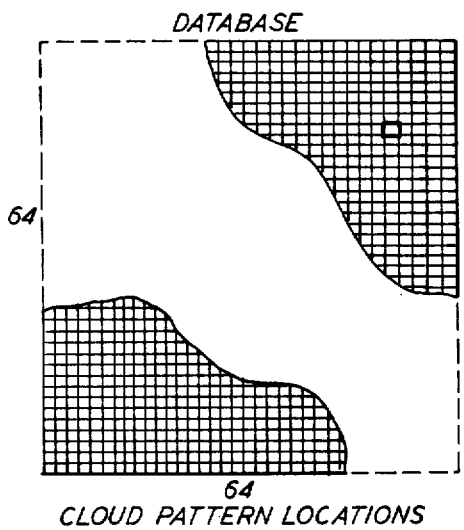
FIG. 4
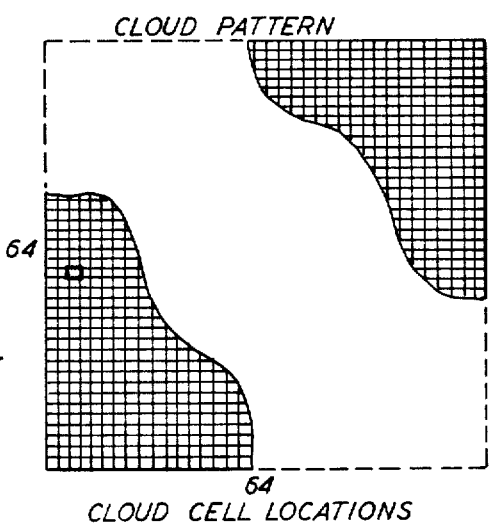
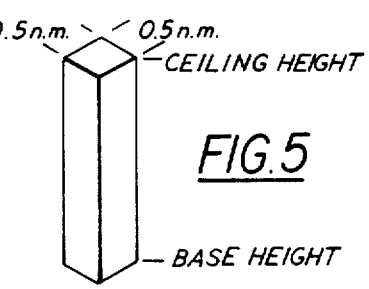
FIG. 5
FIG. 3

WEATHER RADAR SIMULATOR

BACKGROUND

The invention relates to weather radar simulators for use in connection with aircraft simulators.

The function of such a weather radar simulator is to generate realistic radar return signals of cloud formations which would be encountered during a typical air flight. The weather radar simulator is arranged to generate an output signal for connection to a standard weather radar indicator.

Previous attempts to produce a weather radar simulator include an opto-mechanical arrangement using a flying spot scanner, and a more sophisticated approach includes a high degree of computation involving complex radar equations that are processed using a relatively large computer.

The flying spot scanner incorporates a light sensor moving across a photographic slide representing varying cloud intensities. This arrangement is subject to the inherent disadvantages of mechanical devices, e.g. maintenance, wear, etc. In addition, it cannot be integrated fully into the simulated mission, due to the physical limitations of the slide dimensions.

The sophisticated complex radar simulator approach cannot be faulted on performance. However, the cost of such a system is sometimes considered out of proportion to both the training value it offers and to the overall cost of an aircraft simulator.

INVENTION SUMMARY

According to the present invention, a weather radar simulator includes beam positioning means to generate, for each of a plurality of directions of a simulated radar beam, address signals representing the spatial coordinates of points on the beam. Data storage means retains weather information in respect of cells of a region in which the radar beam is assumed to propagate, such storage means being addressed by signals for read-out of weather information in respect of cells through which the beam passes. Processing means, responsive to the read-out weather information, calculates, for each beam direction, the corresponding beam attenuation to form a video signal for connection to a radar display indicator.

Preferably, the data storage means has first storage means with storage locations, which are addressed by the higher order parts of the address signals, each containing a code word specifying a weather pattern for a respective multi-cell location of the region, and second storage means with a plurality of groups of memory locations, each group having memory locations with each location containing weather information in respect of a respective cell. The addressing means is responsive to code words read from the first storage means to select a corresponding one of the groups of memory locations, and the addressing means is responsive to the lower order parts of the address signals to select a cell with that group.

In a preferred embodiment, the stored weather information includes cloud intensity information and cloud base and ceiling heights, and the computation means is arranged to compare these heights with beam height and tilt data. For each beam position, the computation means accumulates the intensities of all those cloud cells on the beam path up to that position, for which the beam height lies between the base and the ceiling heights.

The beam positioning means, preferably, receives input data representing the coordinates of the origin of the beam, e.g., the position of an aircraft upon which a radar scanner is assumed to be mounted.

THE DRAWINGS

The presently preferred embodiment of the invention will now be described, by way of example, with reference to the accompanying drawings, in which:

FIG. 2 is a diagram illustrating radar beam coordinates; and

FIG. 3 is a diagram illustrating one cloud data storage organization.

FIG. 4 is a diagram illustrating cloud pattern locations in a data base, according to the invention.

FIG. 5 is a diagram illustrating one cloud cell within the cell locations pattern of FIG. 3.

DETAILED DESCRIPTION

Figure 1:
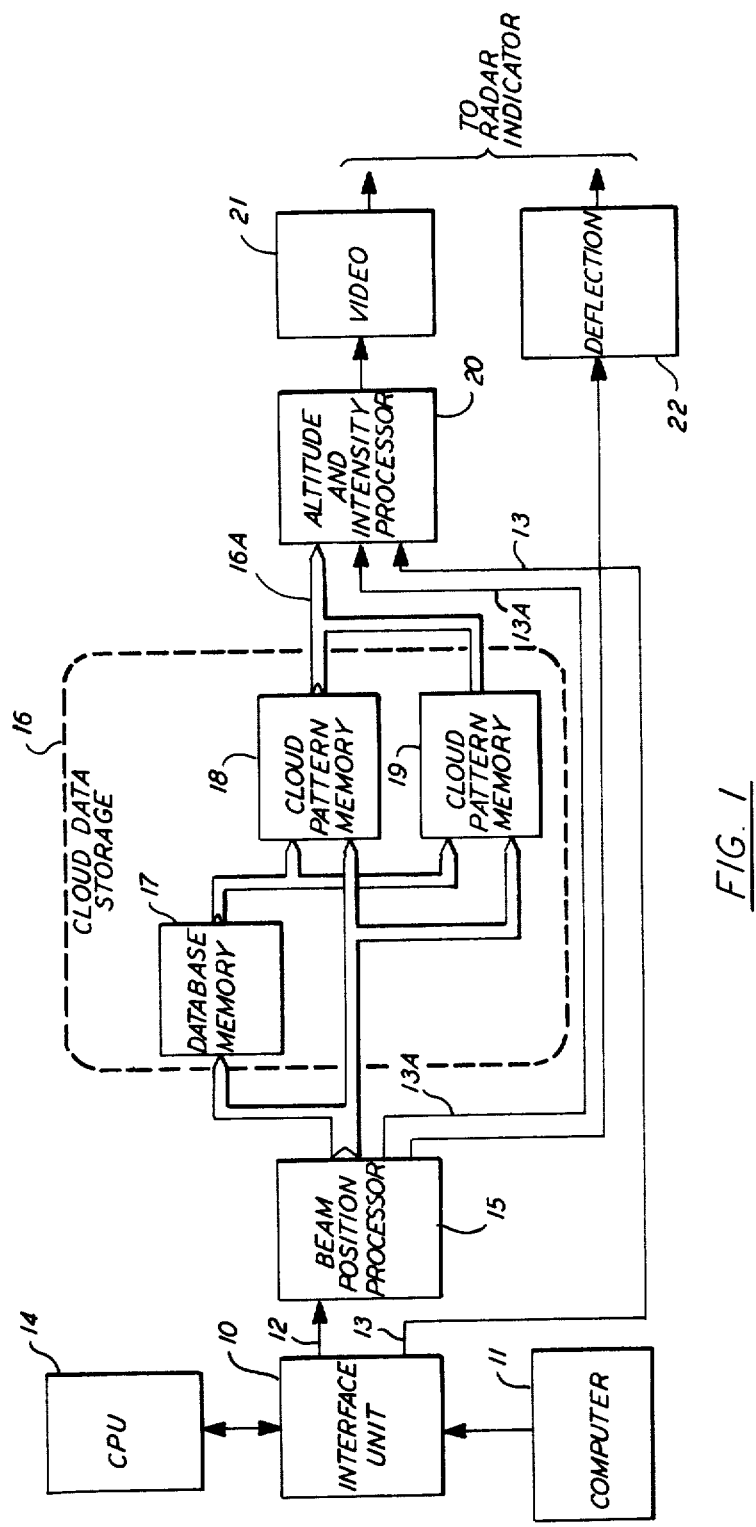
FIG. 1 is a block diagram of a weather radar simulator according to the invention.

The weather radar simulator shown in FIG. 1 is intended for use with an aircraft simulator which is assumed to be controlled by a computer. It serves to produce a simulated radar signal for display on a standard weather radar indicator mounted in the cockpit of the aircraft simulator.

The interfacing between a computer 11 and the weather radar simulator is achieved by an input-output interface unit 10. Aircraft location parameters and also control data, such as radar status information, are connected from the computer 11 directly to the interface unit 10.

The data are received and distributed over output lines 12 and 13 to other units of the weather radar simulator under control of a central processor unit (CPU) 14. The CPU 14 supervises the input of each data word and performs a software parity check to verify data validity. It then controls distribution of the data to the relevant output line of the input-output interface unit, and also, it includes provision for manipulation of the incoming data so as to modify the aircraft position information to give the impression of a more dynamic weather system.

Thus, although the embodiment to be described uses a data storage device for data representing fixed cloud formations, cloud movement can be simulated by applying a progressive shift to the aircraft position information.

Aircraft position information is connected from the input-output interface unit 10 over an output line 12 to a beam position processor 15, which performs three principal tasks:

(a) system timing (b) generation of simulated antenna azimuth position data.

(c) calculation of the X-Y coordinates of points on the radar beam path.

System timing is derived from a crystal oscillator (not shown) from which is obtained pulses, at a pulse repetition frequency of 400 Hertz (Hz), which is the frequency used in typical aircraft equipment.

The beam position processor 15 generates angle data representing antenna azimuth position over a range ±90° of aircraft heading in the form of a 12 bit data word in BRAMS (Binary Related Angular Measuring System) for the video processing section which will be described further below. For a 400 Hz pulse repetition rate and 120° per second scan rate, the antenna azimuth rotation between successive radar pulses is 0.3°.

Using the X-Y coordinates of the aircraft position information from the computer 11, along with the simulated antenna position information generated as described above, the X-Y coordinates of the radar beam at successive positions are derived for each range value. In the described embodiment, a range of 175 nautical miles is covered, and to obtain higher resolution at shorter range, the simulated range bin increments are non-linear.

Thus, the beam position for range values between 0 and 20 nautical miles is based on a 0.25 nautical mile increment, while range values between 20 and 50 nautical miles are based on a 0.5 nautical mile increment, and for range values from 50 to 175 nautical miles, a 1.00 nautical mile increment is used. This produces a total of 265 range bins per scan. With a pulse frequency of 400 Hz, this gives a radar beam position update rate of 9.4 microseconds.

The radar position is calculated for each of the 265 range bins for every 0.3° azimuth scan. In order to take into account the characteristics of the main antenna lobe, two other beam positions are calculated at angles of ±1.75° of the antenna pointing angle, called the "boresite", as illustrated in FIG. 2.

The X-Y coordinates are calculated using:

$$X = R \sin(\theta + \phi) + X_{A/C} \text{ nautical miles}$$

$$Y = R \cos(\theta + \phi) + Y_{A/C} \text{ nautical miles}$$

where
R = range
$\theta$ = aircraft heading angle
$\phi$ = antenna pointing angle
$X_{A/C}$ and $Y_{A/C}$ = X-Y coordinates of aircraft location.
Therefore, for each 9.4 microsecond period, three values of the X and Y coordinates are obtained.

The X and Y beam coordinates are used to read out cloud pattern information from a cloud data storage 16. Basically the cloud data storage 16 contains a cloud map in which the area covered is divided into cells and data is stored indicating the cloud intensity and the base and ceiling heights for each cell.

The manner in which this data is stored will now be described in more detail.

In the embodiments shown, the cloud data storage 16 contains 3 memories, each with a capacity of 64,000 (or 64K) bytes provided by thirty two 2K × 8 erasable-programmable-read-only memories (EPROMs). The storage 16 contains up to 16 cloud maps, and accordingly, the first memory (the database memory 17) stores up to 16 databases.

Each database occupies a memory space of 4K × 8, representing 4096 cloud pattern locations on a 64 × 64 matrix. Each memory location contains an 8 bit data word which is a code specifying which of a predetermined number of possible cloud patterns occurs in that particular cloud pattern location.

The six most significant bits of each of the X and Y coordinates from the beam position processor 15 provide a 12 bit address to the database memory 17. The remaining 4 bits, for selection of the desired database, will be provided by selection means (not shown).

The 8 bit data format used in the database memory 17 is capable of selecting from up to a maximum of 256 cloud patterns, but the embodiment described provides only 16 cloud patterns which are stored in second and third memories, cloud pattern memories 18 and 19. Each of these is of identical construction to the database memory 17.

Each cloud pattern represents an area of sky equal to 32 × 32 nautical miles and occupies a memory space of 4K × 16, a cloud pattern consisting of 4,096 cloud cell locations, again on a 64 × 64 matrix. The cloud pattern memories 18 and 19 receive a 12-bit address from the beam position processor 15 (i.e. the least significant bits of the X and Y beam coordinates) and 4 bits from the database memory 17.

The 16-bit data output contains information on cloud cell intensity and cloud base and ceiling heights. This data is formatted as:
3 bits—cloud intensity (8 levels)
6 bits—ceiling height in units of 1,000 ft.
6 bits—base height in units of 1,000 ft.
1 bit—unused.

This arrangement enables a three-dimensional cloud map to be formed covering an area of 2048 × 2048 nautical miles × 64,000 ft. A two-tier memory arrangement, with the cloud pattern memories 18 and 19 storing a relatively small number of possible cloud patterns for each cloud location, represents a very substantial reduction in memory requirement compared with that which would be required if a separate memory location were provided for each cell of the total area to be covered.

The outline of a cloud pattern is configured by coding any of the 16 cloud patterns into each of the 4,096 locations in the database memory 17.

The cloud data storage 16, described above, does not admit the possibility of two discontinuous sections of cloud within a single cloud cell. Of course, the capacity of the cloud pattern memories 18 and 19 could be expanded to permit the inclusion of two or more sets of cloud intensity and ceiling and base height data per cell to admit the possibility of overlying cloud formations.

The cloud information from the cloud data storage 16 is connected to an altitude and intensity processor 20 over an output connection 16A. The first task of this unit is to establish whether the radar beam height lies within the altitude range specified by the base and ceiling heights of the cloud cell under consideration.

The radar beam height is given by the aircraft height modified by the tilt component. The tilt component is given by:

$$Z_{tilt} = K\ R\ \sin\alpha$$

where
R = range of the beam in nautical miles
$\alpha$ = tilt angle in degrees
K = conversion constant in feet per nautical mile.

Thus, the altitude processor 20 receives aircraft height information from the computer 11 over the output connection 13 of the input-output interface unit 10, range information from the beam position processor 15 over an output connection 13A, and tilt angle information (which is generated internally, or it can be input by the user, taking into account if necessary aircraft altitude information from the computer 11,) and the height of the instantaneous beam position is calculated.

This height is compared with the base and ceiling heights of the cloud cell under consideration (from the cloud data storage 16). If the beam falls within these heights, the cloud cell intensity data from the cloud data storage 16 is routed to the intensity processor section of the altitude and intensity processor 20.

The intensity processor section of the altitude and intensity processor 20 serves to determine the intensity of the "paint" on the radar indicator. This can be achieved in a known manner by calculating the range attenuation using this standard radar equation:

$$Pr = \frac{P_t \, G \, A_e \sigma}{(4\pi)^2 \cdot R^4}$$

where
Pr = received power.
$P_t$ = transmitted power.
G = maximum radiation power gain.
$A_e$ = effective receiving antenna area.
$\sigma$ = radar cross-sectional area.
R = range.
Secondly, the attenuation due to absorption in the cloud is applied.

However, in the present embodiment, the radar equation computation is avoided by following a simplified procedure. The intensities of all the cloud cells the beam has passed through before reading the location under consideration are accumulated, and this accumulated intensity, along with the range R, is used to address a look-up table (e.g., a Read-Only-Memory) containing empirically derived weighting factors.

In this way, a radar return intensity signal is obtained as an 8-bit data word. Although this involves a degree of approximation, it is found in practice that the resultant signals are sufficiently accurate for the purpose, particularly when (as is usually the case) one is using a radar display which does not indicate the beam intensity beyond the fact that it exceeds a minimum threshold value.

Normally, the data corresponding to the central (boresite) positions are used unless this does not encounter any cloud, in which case the greater of the two intensities found for the side positions is used, and the three sets of data received by the altitude processor 20 are averaged together.

The intensity values are computed sequentially for the 265 range bins, and owing to the non-linear range bin increments used, the resulting signal has a non-linear range and time relationship. For a conventional radar display unit, these signals must be made linear, and this is achieved by clocking the intensity value for each range bin into a read-write memory at one rate and clocking them out at another rate, which is varied according to the increments used.

To maintain continuity of data flow, two memories are used which are interchanged after each radar scan.

Finally, the altitude and intensity processor 20 converts the calculated 8-bit intensity word for each range bin into an analog signal. The seventh level of cloud intensity constitutes a point at which the indicator, if set to "Contour", will produce an iso-echo presentation.

The final stage of the weather radar simulator includes a video processor 21 and a deflection processor 22. The video processor 21 serves to receive the video signal from the altitude and intensity processor 20 and to add a number of special effects required to add realism to the radar "paint". These effects are mixed with the video signals. The special effects may include:
(a) spurious noise
(b) height ring
(c) ground returns
(d) H. F. spoking
(e) radome icing The composite radar signal is amplified and output over a coaxial line to a suitable radar indicator (not shown). In addition, a prepulse synchronization signal, derived from the beam position processor 15, is amplified also and is output to the suitable radar indicator.

The deflection unit 22 produces indicator deflection signals corresponding to the antenna pointing angle. These signals are output as a 12-bit word from the beam position processor 15 which converts this angle into signals such as would normally be output by a synchro-resolver mounted on the antenna mechanism of a real radar system.

The various units described, especially the beam position processor 15, the altitude and intensity processor 20, with their computational requirements, can be realized, using conventional digital techniques, as hardware systems. Alternatively, they can be realized using one or more suitably programmed computer or microprocessor system, or by a combination of the two. Any number of combinations of computer logic and hardware are possible without deviating from the true spirit and scope of the present invention, which is defined by the claims appended hereto.

I claim:

1. A weather radar simulator, comprising:
   beam positioning means arranged in operation to generate for each of a plurality of directions of a simulated radar beam, address signals representing the spatial coordinates of points on the simulated radar beam;
   storage means for storing weather information in respect of cells of a region in which the radar beam is assumed to propogate;
   the stored information being addressed by said address signals for read-out of said weather information in respect of cells through which the beam passes;
   said storage means comprises first storage means with storage locations, addressed by the higher order parts of the address signals, each containing a code word specifying a weather pattern for a respective multicell location of the region, second storage means with a plurality of groups of memory locations, each group having memory locations each containing weather information in respect of a respective cell, and addressing means responsive to code words read from said first storage means to select a corresponding one of the groups and responsive to the lower order parts of said address signals to select a cell with that group; and
   processing means responsive to the read-out weather information to calculate, for each beam direction, the corresponding beam attenuation to form a video signal for supply to a radar display indicator.

2. A weather radar simulator according to claim 1, in which said plurality of groups of memory locations for storing the weather information comprises a first group for storing cloud intensity information and a second group for storing cloud base and ceiling heights information, said processing means includes means to compare said ceiling heights information with beam position data supplied thereto and, for each beam position, to accumulate the intensitites of all those cloud cells lying on the beam path up to that position for which the beam height lies between said base and ceiling heights.

3. A weather radar simulator according to claim 2, in which said processing means is adapted to generate successive values of the video signal for each beam position responsive to signals corresponding to the accumulated cloud cell intensity and to the range of that beam position, a storage means containing a look-up table of intensity values, and means to connect said successive values of said video signal to said storage means.

4. A weather radar simulator according to claim 3, in which the beam positioning means further comprises means to receive input data representing the coordinates of the origin of the beam.

5. A weather radar simulator according to claim 3, including means to apply a progressive shift to said beam position data to simulate movement of the simulated weather.

* * * * *